United States Patent
Ross et al.

[15] 3,656,531
[45] Apr. 18, 1972

[54] WHEEL FOR A VEHICLE

[72] Inventors: Sherwood B. Ross, Woodmere; William J. Kreizel, Hewlett, both of N.Y.

[73] Assignee: Chain Bike Corporation, Rockaway Beach, N.Y.

[22] Filed: Feb. 10, 1970

[21] Appl. No.: 10,244

[52] U.S. Cl. ................................152/8, 301/63 PW, 301/79
[51] Int. Cl. ..............................B60b 9/26, B60b 5/02
[58] Field of Search................301/63 DD, 63 PW, 64 R, 79, 301/6 CS; 152/9, 10, 153, 30, 8, 7, 6

[56] References Cited

UNITED STATES PATENTS

| | | | |
|---|---|---|---|
| 3,567,285 | 2/1971 | Faurot | 301/79 |
| 1,455,453 | 5/1923 | Smith | 152/153 |
| 1,269,172 | 6/1918 | Forsyth | 301/64 SH |
| 1,169,944 | 2/1916 | Ellis | 301/79 |
| 3,428,365 | 2/1969 | French | 301/65 |

FOREIGN PATENTS OR APPLICATIONS

| | | | |
|---|---|---|---|
| 352,611 | 6/1905 | France | 152/10 |
| 738,414 | 10/1932 | France | 152/9 |
| 885,675 | 12/1961 | Great Britain | 301/63 PW |

*Primary Examiner*—Richard J. Johnson
*Attorney*—Lilling & Siegel

[57] ABSTRACT

A central hub and concentrically spaced rim, and spokes extending radially between the hub and rim and being internally hollow.

5 Claims, 6 Drawing Figures

PATENTED APR 18 1972
3,656,531
SHEET 1 OF 2
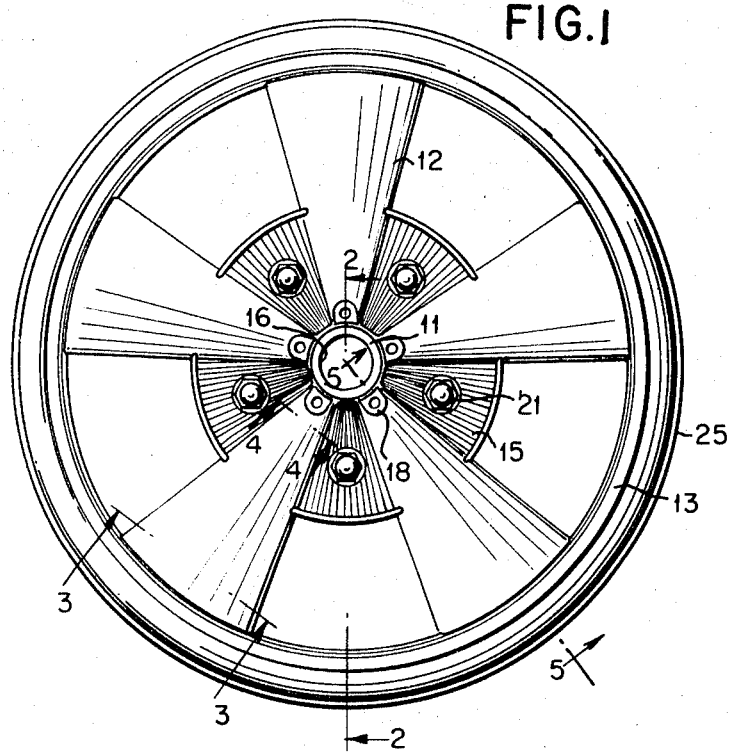
FIG.1
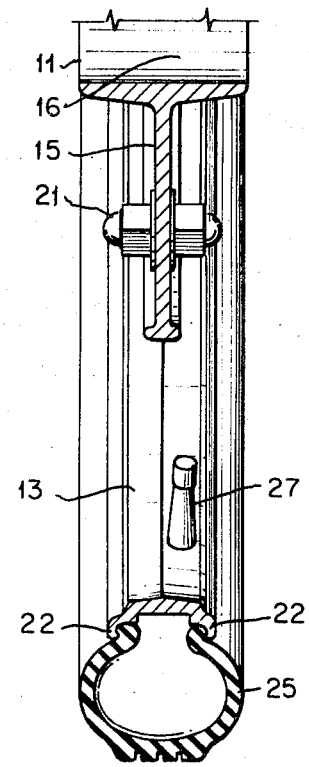
FIG.2
FIG.3
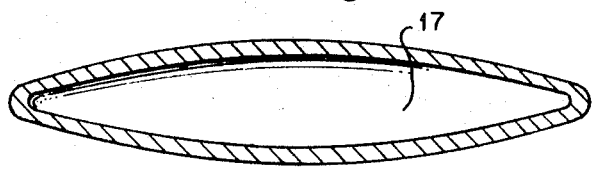
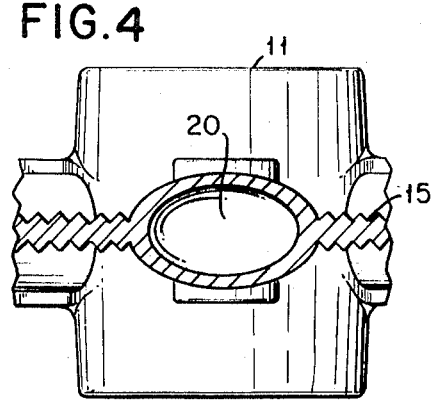
FIG.4
SHERWOOD B. ROSS
WILLIAM J. KREIZEL
INVENTORS
BY Lilling & Siegel
ATTORNEYS

PATENTED APR 18 1972 3,656,531

INVENTORS
SHERWOOD B. ROSS
WILLIAM J. KREIZEL
BY Lilling & Siegel
ATTORNEYS

3,656,531

WHEEL FOR A VEHICLE

BACKGROUND OF THE INVENTION:

While the wheel construction of the present invention has been primarily adopted for use in bicycles, and will be illustrated and described hereinafter with particular reference thereto, it is appreciated that the instant wheel may be employed in a wide variety of other vehicles, including both toy and other wheeled vehicles.

It has, heretofore, been considered preferable to employ bicycle wheels having separate spokes and rim, and requiring a multitude of spokes. This construction is expensive, both in manufacture, and in assembly, and is not entirely satisfactory in use, often requiring repeated adjustment of the spokes for proper shaping of the rim. Also, bicycle rims in the prior art employing separate spokes were required to be provided with a multitude of spoke receiving holes, so that the air-tightness required for use with a tubeless tire was not commercially practical.

SUMMARY OF THE INVENTION

It is an important object of the present invention to provide a wheel construction for vehicles which overcomes the above-mentioned difficulties, being extremely simple in structure and capable of integral fabrication by inexpensive mass production procedures.

It is a further object of the present invention to provide a wheel construction of the type described which is admirably well suited for use with tubeless pneumatic tires.

It is still another object of the present invention to provide a wheel construction having the advantageous characteristics mentioned in the preceding paragraphs, which is adapted to be produced in neat and attractive designs, and which is staunch and durable in operation, for high reliability throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an elevational view showing a wheel constructed in accordance with the teachings of the present invention.

FIG. 2 is a partial sectional view taken generally along the line 2—2 of FIG. 1.

FIG. 3 is a sectional view taken generally along the line 3—3 of FIG. 1.

FIG. 4 is a sectional view taken generally along the line 4—4 of FIG. 1.

DESCRIPTION OF THE PREFERRED EMBODIMENT

Figure 6:
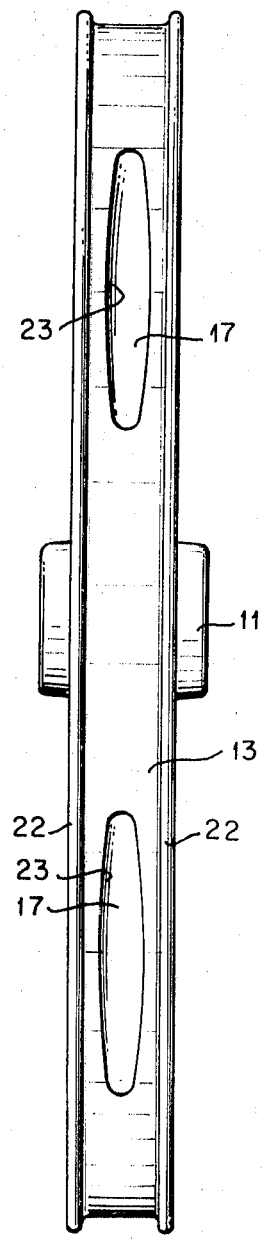
FIG. 6 is a side view of the wheel of FIG. 1 without a tire.

Referring now more particularly to the drawings, and specifically to FIG. 1 thereof, a wheel is there generally designated 10, and includes a hub 11 and a plurality of spokes 12 radiating from the hub in angularly spaced relation with respect to each other. Circumposed in spaced concentric relation about the central hub 11 is an outer circular member or rim 13 being fixed at spaced locations there along to the radially outer or distal ends of the several spokes 12. A plurality of triangular or sector shaped reinforcement webs, reinforcement plates or gussets 15 are each interposed between the radially inner end regions of each adjacent pair of spokes 12.

More specifically, the hub 11 may be of any suitable construction, say being centrally open as at 16, to receive a shaft or axle. The spokes 12 may each be of a hollow, oblate conical configuration, having an internal hollow 17 extending longitudinally within the respective spoke and of an elongate or ovaloid cross-sectional configuration, as seen in FIG. 3. The major axis of the ovaloid cross-sectional configurations of the several spokes 12 are substantially coplanar, and lie in a plane normal to the axis of hub 11.

Figure 5:
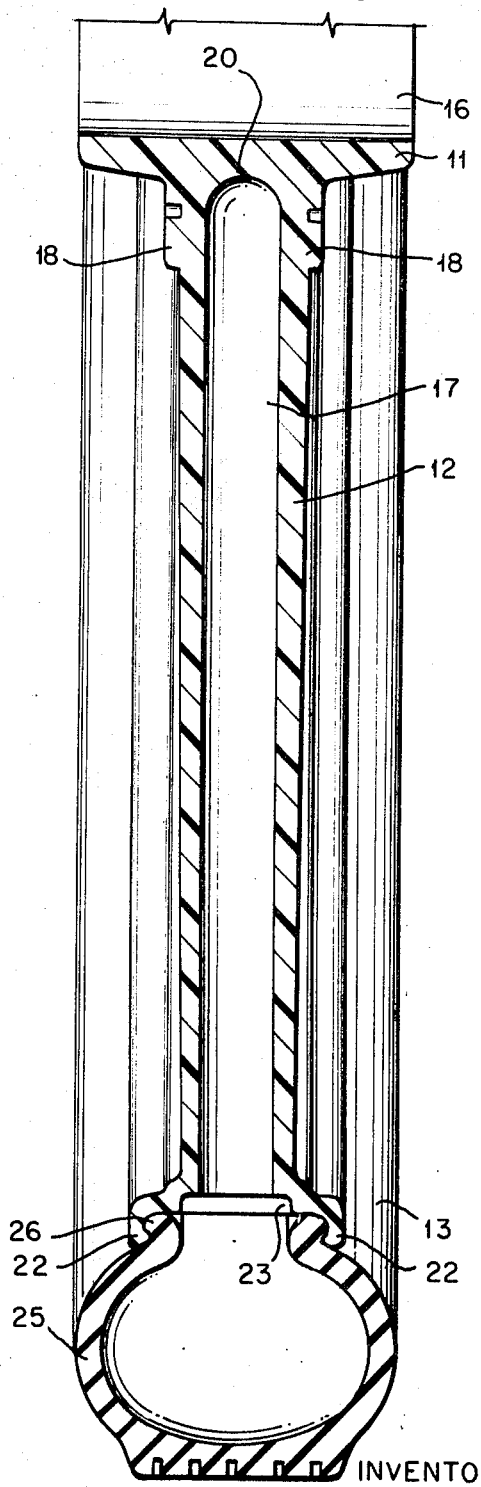
FIG. 5 is a sectional view taken generally along the line 5—5 of FIG. 1.

Thus, the several spokes 12, which are spaced angularly about the hub 11, extending radially outwardly therefrom, are each of a hollow, outwardly flaring tubular or conical configuration, and of oblate cross-sectional configuration to lie coplanar with each other. The radially inner end regions of the spokes 12, on the outer surfaces thereof, may be formed with externally protruding bosses or lugs, as at 18, for strengthening and ornamental design. The inner end of each spoke hollow 17, as best seen in FIGS. 4 and 5, is closed, as by an end wall 20 at the hum 11. Thus, the interior 17 of each spoke 12 does not communicate with the interior 16 of the hub 11.

By way of reinforcement, and further strengthening, there may be provided the gussets or plates 15, each extending radially outwardly from the hub 11 and between the adjacent radially inner portions of an adjacent pair of spokes 12. The plates or gussets 15 may be suitably configured for additional strengthening or ornamental design, as by the simulated fasteners 21.

In practice, all of the parts thus far described, including the hub 11, several radially extending spokes 12 and interposed gussets 15 may be integrally fabricated, say of suitable plastic material, as by any desired plastic molding or fabricating procedures.

In addition, the rim 13 extends concentrically about the central hub 11, being spaced radially outwardly therefrom, and is fixedly secured to and formed integrally with the outer ends of the several spokes 12. This integral formation of spoke and rim is best seen in FIG. 5. The rim 13 may be of a cross-sectional configuration similar to that of conventional wheel rims for carrying tires, say having a pair of circumferentially extending radially outstanding flanges 22 for retaining engagement with the lips of a tire, as will appear presently. Also, in FIGS. 5 and 6 it will be apparent that the rim 13 is provided at spaced locations there along with a plurality of openings, as at 23, each of which is aligned with and communicates into the interior hollow 17 of a respective spoke 12. Thus, each of the spokes 12 has its interior hollow 17 communicating radially outwardly through the adjacent opening 23 of the rim 13.

While a conventional pneumatic tire and contained tube may be applied to the rim 13, as described hereinbefore, the instant structure lends itself to the mounting thereon of a tubeless tire, as at 25, to achieve the advantageous results thereof. That is, the tubeless tire 25 has its sealing lips 26 each engaged in sealing relation with a respective rim flange 22, to maintain the pneumatic tightness thereof. If desired, a conventional air valve may be located in the rim 13, as at 27 in FIG. 2. The pneumatic character of the tire 25 is enhanced by the greater volume of air contained not only in the tire itself but also in the spokes 12. If desired, an air valve may be located in one of the spokes 12.

From the foregoing, it will now be appreciated that the present invention provides a wheel construction which is adapted to be integrally fabricated of plastic, affording uniqueness in strength, durability and attractive appearance not heretofore available, and capable of carrying a pneumatic tire of the tubeless type with enhanced pneumatic characteristics for ease of ride.

While the instant wheel construction may advantageously be employed in bicycles, the beneficial features thereof are capable of use in many various ground engageable wheel requirements, all of which are intended to be comprehended herein.

Although the present invention has been described in some detail by way of illustration and example for purposes of clarity of understanding, it is understood that certain changes and modifications may be made within the spirit of the invention.

We claim:

1. A wheel construction for a vehicle, said wheel construction comprising a central hub for connection to a shaft, a plurality of spokes extending radially outwardly from said hub, said spokes each being internally hollow and of flared configuration in the radially outward direction generally throughout their length, a rim having a pair of spaced flanges for retaining a pneumatic tire extending concentrically about said hub and fixedly secured to the outer ends of said spokes, the internal hollow of each spoke opening at its radially outer end through the adjacent region of said rim, a plurality of generally sector-shaped webs each extending between the radially inner end regions of an adjacent pair of said spokes, and said hub, spokes and rim being integrally fabricated of plastic material.

2. A wheel construction according to claim 1, the interior hollow of each spoke being closed at its radially inner end, and a pneumatic tire on said rim.

3. A wheel construction according to claim 2, said tire being tubeless and in fluid communication with the interior of said spokes.

4. A wheel construction according to claim 1, in combination with a plurality of generally sector-shaped webs of plastic material integral with and extending between the radially inner end regions of adjacent pairs of said spokes.

5. A wheel construction according to claim 4, the internal hollow of each spoke being closed at its radically inner end and opening at its radially outer end through the adjacent portion of said rim, and a tubeless pneumatic tire on said rim in fluid communication with the internal hollows of said spokes.

* * * * *